United States Patent [19]

Okada et al.

[11] Patent Number: 5,376,294
[45] Date of Patent: Dec. 27, 1994

[54] ELECTRORHELOGICAL FLUID

[75] Inventors: Izuho Okada; Yoshinobu Asako; Kiyomi Arimatsu; Minoru Kobayashi; Satoru Ono; Ryuji Aizawa, all of Ibaraki, Japan

[73] Assignee: Nippon Shokubai Co., Ltd., Osaka, Japan

[21] Appl. No.: 89,126

[22] Filed: Jul. 9, 1993

Related U.S. Application Data

[63] Continuation-in-part of Ser. No. 810,496, Dec. 19, 1991, abandoned.

[30] Foreign Application Priority Data

| Aug. 29, 1991 | [JP] | Japan | 3-218227 |
| Oct. 21, 1991 | [JP] | Japan | 3-272212 |
| Feb. 25, 1993 | [JP] | Japan | 5-036323 |
| Feb. 25, 1993 | [JP] | Japan | 5-036324 |
| Feb. 25, 1993 | [JP] | Japan | 5-036325 |
| Feb. 25, 1993 | [JP] | Japan | 5-036326 |

[51] Int. Cl.$^5$ .................. C10M 169/04; C10M 171/00
[52] U.S. Cl. ........................... 252/78.3; 252/73; 252/572; 556/440
[58] Field of Search .......... 252/78.3, 73, 572; 556/440

[56] References Cited

U.S. PATENT DOCUMENTS

| 4,314,068 | 2/1982 | Novicky | 556/440 |
| 4,356,098 | 10/1982 | Chagnon | 252/62.51 |
| 4,645,614 | 2/1987 | Goossens et al. | 252/75 |
| 4,772,407 | 9/1988 | Carlson | 252/74 |
| 5,039,761 | 8/1991 | Ono et al. | 556/440 |

*Primary Examiner*—Christine Skane
*Attorney, Agent, or Firm*—Omri M. Behr; Matthew J. McDonald

[57] ABSTRACT

An electrorheological fluid comprising a dielectric particle as the dispersed phase, an insulating oil as the dispersing medium, and an additive, the additive being substantially insoluble in the dispersing medium, and being a composite containing a polysiloxane-containing structural unit (A), and at least one dispersed phase absorbing chain-containing structural unit (B) selected from the group consisting of an alkylene oxide chain-containing structural unit (B-1), a nitrogen atom chain-containing structural unit (B-2), and a long hydrocarbon chain-containing structural unit (B-3).

13 Claims, No Drawings

ELECTRORHELOGICAL FLUID

This application is a continuation-in-part of application Ser. No. 810,496 filed Dec. 19, 1991, now abandoned.

BACKGROUND OF THE INVENTION
1. Field of the Invention

The present invention relates to an electrorheological fluid. More specifically, it relates to an electrorheological fluid which has excellent properties in that a large shear stress and low current density can be generated even when a relatively low electric field is applied to the fluid and the generated shear stress and current density has excellent stability properties with time. The invention also has excellent properties in regard to dispersion stability under the conditions of no electric field (the ability to uniformly maintain an electrorheological fluid and not settle or float the dispersed phase therein), re-dispersibility (the ability to duplicate a uniform electrorheological fluid by applying a simple external force when the dispersed phase therein has settled and floats in a non-uniform state), and fluidity (having a low viscosity under the conditions of no electric field).

2. Description of the Prior Art

There are known, as electrorheological fluids generating high shear stress, a fluid in which a powdered ion-exchange resin is dispersed in the higher alkyl ester of an aromatic carboxylic acid (Japanese Kokai (Japanese patent Laid-open) 50-92278), a composition composed of a crystalline material which conducts current only along one of the three crystalline axes, a dielectric fluid, and suspension stabilizing agent (Japanese Kokai 1-170693), and a fluid using, as a dispersed phase, a conductive particle covered with a film layer of insulating material (Japanese Kokai 64-6096). However, these electrorheological fluids have the disadvantages of poor dispersion stability under the conditions of no electrical field, poor re-dispersibility after sedimentation and floatation, and poor fluidity when the concentration of the dispersed phase is increased.

In order to improve the dispersion stability, there have been proposed the use of modified polysiloxane as an additive (Japanese Kokoku 3-39560), the use of a polymer having an ester group and an aromatic group structure as the additive (Japanese Kokai 4-96997) or the like. However, these additives serve only to prevent the sedimentation of the dispersed phase, but have the drawback of a reduction of the re-dispersibility after sedimentation.

Further, in order to improve the re-dispersibility, there have been proposed electrorheological fluids using fine particles as the additive (Japanese Kokai 3-160094 and Japanese Kokai 3-166295) or the like. However, these electrorheological fluids have problems in that the shear stress obtained when an electric field is applied, decreases due to the addition of the fine particles, the conditions of use for the electrorheological fluids are defined due to the poor dispersion stability, and it is necessary for the device used to be equipped with an additional re-dispersibility system.

An object of the present invention, therefore, is to provide an electrorheological fluid.

Another object of the present invention is to provide an electrorheological fluid which has excellent properties in that even when a relatively low electric field is applied to the fluid, a large shear stress is generated while the current density is small, and the generated shear stress and current density exhibit excellent stability with time. The invention also has excellent properties in regard to dispersion stability under the conditions of no electrical field (the ability to uniformly maintain an electrorheological fluid and not settle or float the dispersed phase therein), re-dispersibility (the ability to duplicate a uniform electrorheological fluid by applying a simple eternal force when the dispersed phase has settled and floated in a non-uniform state), an fluidity (having a low viscosity under the conditions of no electric field).

SUMMARY OF THE INVENTION

According to the present invention, there is provided an electrorheological fluid comprising a dispersed phase made of a dielectric particle, a dispersing medium made of an insulating liquid, and an additive, said additive being substantially insoluble in said dispersing medium, and being a composite containing a polysiloxane-containing structural unit (A) represented by the following formula (1):

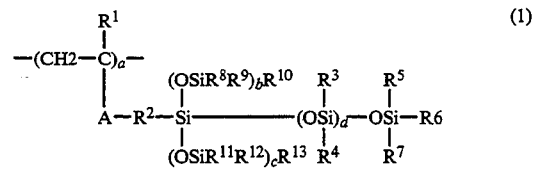

wherein A is —COO— or a phenylene group, $R^1$ a hydrogen atom or methyl group, $R^2$ an alkylene group of 1–6 carbon atoms, $R^3$–$R^{13}$ are same or different, aryl groups, alkyl groups of 1–6 carbon atoms, or alkoxy groups of 1–10 carbon atoms, a an integer, b and c the same or different integers of 0–10, d an integer of 0–200, and at least one dispersed phase absorbing chain-containing structural unit (B) selected from the group consisting of an alkylene oxide chain-containing structural unit (B-I) represented by the following formula 2:

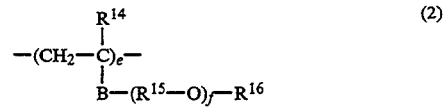

wherein B is —COO— or a phenylene group, R14 a hydrogen atom or methyl group, R15 an alkylene group of 2–4 carbon atoms, R16 a hydrogen atom or alkyl group, e an integer, f an integer of 2–100, a nitrogen atom chain-containing structural unit (B-2) represented by the following formula 3:

wherein D is

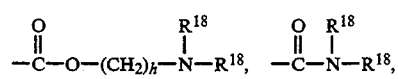

—CN or a substituent having a nitrogen containing heterocyclic ring $R^{18}$ a hydrogen atom or an alkyl group, g an integer, and h an integer of 2-6, and a long hydrocarbon chain-containing structural unit (B-3) represented by the following formula 4:

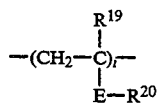
(4)

wherein E is —COO— or phenylene group, $R^{19}$ a hydrogen atom or methyl group, $R^{20}$ an alkyl group of 4-30 carbon atoms, and i an integer.

DESCRIPTION OF THE PREFERRED EMBODIMENT

The dielectric particle to be used for the dispersed phase of the electrorheological fluid of the present invention is a particle which can be polarized when an electric field is applied. Examples of the dielectric particle are, but not limited to, an organic particle having an hydrophilic group such as starch, cellulose, an ion-exchange resin, and a sulphonic acid group-containing polystyrene polymer; a hydrophilic inorganic particle such as silica and alumina; a composite particle being a particle having three layers with an organic solid particle for center portion, a conductive film layer covering the organic solid particle, and an electric insulating film layer covering the conductive film layer, a particle in which the surface of a conductive particle such as aluminum is covered with a thin insulating film, a particle using a carbonaceous powder, a particle obtained by dispersing a conductive particle such as carbon black into a resin; an organic semiconductive particle such as poly(acene-quinone); a strong dielectric particle such as barium titanate, lithium tartrate. In view of the large shear stress when an electric field is applied and excellent stability with time due to the small current density, a sulfonic acid group-containing polystyrene polymer is preferred among the mentioned particles.

The dielectric particle has preferably an average particle diameter of 1-50 μm. If the average particle diameter is not more than 1 μm, the resultant electrorheological fluid is not likely to have a large shear stress when an electric field is applied. Adversely, if the average particle diameter is not less than 50 μm, it is difficult to obtain an electrorheological fluid with excellent dispersion stability properties under no electric field conditions.

The dispersing medium to be used for the electrorheological fluid of the present invention is an electric insulating oil. Examples of the dispersing medium are, but not limited to, a silicone oil such as polydimethylsiloxane, a partially octyl replaced polydimethyl-siloxane, a partially phenyl replaced polydimethyl-siloxane; a hydrocarbon such as fluid paraffin, decane, methyl naphthalene, decalin, diphenylmethane, and a partially hydrogenated triphenyl; Electric insulating oil containing mainly mineral hydrocarbon (a product sold by Cosmo Oil Co., Ltd.); a halogenated hydrocarbon such as chlorobenzene, dichlorobenzene, bromobenzene, chlorodiphenyl methane; an organic fluorine compound such as Diflon (a product sold by Daikin Industries Ltd. in Japan), Demnum (a product sold by Daikin Industries Ltd. in Japan); and an ester compound such as dioctyl phthalate, trioctyl trimellitate, and dibutyl sebacate. Of these one or more members may be used. In view of the fluidity when an electric field is not applied, the viscosity of the dispersing medium is preferably not more than 500 cP, more preferably not more than 100 cP.

We have found that the properties in respect of dispersion stability, re-dispersibility and fluidity of electrorheological fluids, are improved by adding a specific additive into electrorheological fluids to regulate the dispersed phase in the dispersing medium. As a result, the present invention has been achieved.

The additive to be used for the electrorheological fluid of the present invention is a composite substantially insoluble in the dispersing medium. The composite has a polysiloxane-containing structural unit (A) and at least one dispersed phase adsorbing chain-containing structural unit (B) selected from the group consisting of an alkylene oxide chain-containing structural unit (B-1), a nitrogen atom chain-containing structural unit (B-2), and a hydrocarbon chain-containing structural unit (B-3). By adding the additive to generate an adequate interaction between the dispersed phase and the dispersing medium, the electrorheological fluid has good properties in respect of dispersion stability, re-dispersibility and fluidity.

The composite is required to be substantially insoluble in the dispersing medium. The composite may wholly or partially swell in the insulating liquid of the electrorheological fluid. When the composite is substantially insoluble in the dispersing medium, an electrorheological fluid capable of preventing the contact of the particles of dispersed phase with each other and having excellent re-dispersibility and fluidity properties can be obtained. If the composite is soluble in the insulating liquid, the resultant electrorheological fluid has poor re-dispersibility and fluidity.

The composite to be used for the present invention essentially has a polysiloxane-containing structural unit (A) and a dispersed phase adsorbing chain-containing structural unit (B). Using the polysiloxane-containing structural unit (A), a suitable interaction between the composite and the dispersing medium gives dispersion stability and fluidity to the electrorheological fluids. If there is no polysiloxane-containing structural unit (A), the electrorheological fluid has the problems of a decrease of the dispersion stability and fluidity. Further, using a dispersed phase absorbing chain-containing structural unit (B), a suitable interaction between the composite and the particle of the dispersed phase gives dispersion stability to the electrorheological fluids. Adversely, with the absence of the dispersed phase absorbing chain-containing structural unit (B), the resultant electrorheological fluid has the problem of a decrease of the dispersion stability.

The substantially insoluble properties of the composite of the present invention are provided, for instance, according to the following procedures, e.g. (1) a method for producing a crosslinked polymer having polysiloxane-containing structural unit (A) and dispersed phase adsorbing chain-containing structural unit (B), and (2) a method for producing a composite composed of a particle (I) substantially insoluble in the insulating liquid and a polysiloxane-containing polymer (11) containing polysiloxane-containing structural unit (A) and dispersed phase adsorbing chain-containing structural unit (B).

Methods (1) and (2) are explained in turn in more detail.

Method (1)

In producing the composite to be used for the present invention, the preparation method is carried out, for instance, according to the following two procedures, e.g. (1-1) a method for producing a composite of the present invention by precipitation-polymerization a monomer mixture (X) containing a silicone macromer (am) represented by the following formula 5:

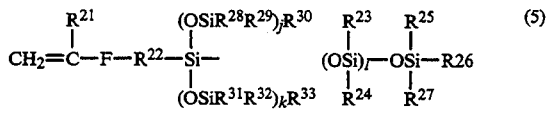

wherein the symbol F is —COO— or a phenylene group, $R^{21}$ a hydrogen atom or methyl group, $R^{22}$ an alkylene group of 1–6 carbon atoms, $R^{23}$–$R^{33}$ are the same or different aryl groups, alkyl groups of 1–6 carbon atoms, and alkoxy groups of 1–10 carbon atoms, j and k the same or different integer of 0–10, and l an integer of 0–200, an alkylene oxide chain-containing macromer (bm-1) represented by the following formula 6:

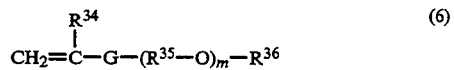

wherein G is —COO— or a phenylene group, $R^{34}$ a hydrogen atom or methyl group, $R^{35}$ is an alkylene group of 2–4 carbon atoms, $R^{36}$ a hydrogen atom or alkyl group, and m an integer of 2–100, (cx) a crosslinking monomer having more than two double bonds therein, and an optional (dx), or (1-2) a method for producing a composite of the present invention by polymerizing silicone macromer (am), an alkylene oxide chain-containing macromer (bm-1), and optional (dx), and then crosslinking it using crosslinking monomer (cx). Of these method (1-1) is preferred.

Method (1-1)

Monomer mixture (X) contains four components of silicone macromer (am), alkylene oxide chain-containing macromer (bm-1), crosslinking monomer (cx), and optional (dx).

As silicone macromer (am), there are cited, for instance, (meth)acryloyl group-containing polydimethyl siloxane, styryl group-containing polydimethyl siloxane, (meth)acryloyl group-containing and partially octyl substituted polydimethyl siloxane, styryl group-containing and partially octyl substituted polydimethyl siloxane, (meth)acryloyl group-containing and partially phenyl substituted polydimethyl siloxane, tris(trimethylsiloxy) sirylpropyl (meth)acrylate. Of these one or more members may be used.

As alkylene oxide chain-containing monomer (bm-1), there are cited, for instance, a polyalkylene glycol having a double bond such as a (meth)acryloyl group-containing polyethylene glycol, a styryl group-containing polyethylene glycol, a p-isopropenyl benzyl group-containing polyethylene glycol, a (meth)acryloyl group-containing polypropylene glycol, a styryl group-containing polypropylene glycol, a p-isopropenyl benzyl group-containing polypropylene glycol, a (meth)acryloyl group-containing polytetramethylene glycol, a styryl group-containing polytetramethylene glycol, and a p-isopropenyl benzyl group-containing polytetramethylene glycol. Of these one or more members may be used.

As crosslinking monomer (cx), there are cited, for instance, a polyfunctional polymerizable aromatic compound such as divinyl benzene, vinyl propenylbenzene, vinyl isopropenylbenzene, vinyl isobutenylbenzene, diisopropenyl benzene, isopropenyl isobutenylbenzene, diisobutenyl benzene, divinyl methylbenzene, divinyl ethylbenzene, divinyl dimethylbenzene, trivinyl benzene, triisopropenyl benzene, divinyl naphthalene, vinyl isopropylnaphthalene, diisopropenyl naphthalene, divinyl anthracene, and divinyl phenanthrene; polyfunctional polymerizable (meth)acrylate derivatives such as ethylene glycol di(meth)acrylate, diethylene glycol di(meth)acrylate, triethylene glycol di(meth)acrylate, tetraethylene glycol di(meth)acrylate, propylene glycol di(meth)acrylate, dipropylene glycol di(meth)acrylate, tripropylene glycol di(meth)acrylate, 1,3-butylene glycol di(meth)acrylate, 1,4-butanediol di(meth)acrylate, 1,6-hexanediol di(meth)acrylate, neopentyl glycol di(meth)acrylate, tris(2-hydroxyethyl) isocyanurate tri(meth)acrylate, pentaerythritol tetra(meth)acrylate, pentaerythritol tri(meth)acrylate, dipentaerythritol penta(meth)acrylate, trimethylol propane tri(meth)acrylate, ditrimethylol propane tetra(meth)acrylate, glycerol di(meth)acrylate, tetramethyl tri(meth)acrylate, and tetramethyl tetra(meth)acrylate; polyfunctional polymerizable (meth)acryl amide derivatives such as N, N'-methylene bis((meth)acrylamide), and N,N'-ethylene bis((meth)acrylamide; polyfunctional polymerizable allyl derivatives such as diethylene glycol diallyl ether, diallyl chlorendate, diallyl phthalate, diallyl hexahydrophthalate, and triallyl trimellitate. Of these one or more members may be used.

As optional (dx), there are cited, for instance, monomers of olefins such as ethylene, propylene, butylene, pentene, hexene, heptene, octene, cyclopentene, and cyclohexene; halogenated olefins such as vinyl fluoride, vinylidene fluoride, trifluoroethylene, tetrafluoroethylene, vinylchloride, vinylidene chloride, vinylene chloride, and vinyl bromide; alkyldienes such as butadiene, isoprene, and cyclopentadiene; aryl alkenes such as styrene, methylstyrene, ethylstyrene, propylstyrene, butylstyrene, pentylstyrene, vinylnaphthalene, methyl vinylnaphthalene, ethyl vinylnaphthalene, propyl vinylnaphthalene, butyl vinylnaphthalene, pentyl vinylnaphthalene, hexyl vinylnaphthalene, vinylanthracene, methyl vinylanthracene, ethyl vinylanthracene, propyl vinylanthracene, butyl vinylanthracene, pentyl vinylanthracene, hexyl vinylanthracene, vinylphenanthrene, methyl vinylphenanthrene, ethyl vinyl phenanthrene, propyl vinylphenanthrene, butyl vinylphenanthrene, pentyl vinylphenanthrene, hexyl vinylphenanthrene, fluorostyrene, chlorostyrene, bromostyrene, dichlorostyrene, trichlorostyrene, tetrachlorostyrene, chloromethyl styrene, hydroxymethyl styrene, aminomethyl styrene, chloro vinylnaphthalene, chloro vinylanthracene, and chloro vinylphenanthracene; the esters of (meth)acrylate such as methyl (meth)acrylate, ethyl (meth)acrylate, propyl (meth)acrylate, pentyl (meth)acrylate, hexyl (meth)acrylate, and hydroxyethyl (meth)acrylate; (meth)acrylamides such as (meth)acrylamide, and dimethyl(meth)acrylamide; vinyl ethers such as methylvinyl ether, ethylvinyl ether, butylvinyl ether, pentylvinyl ether, and hexylvinyl ether; vinyl esters such as vinyl acetate, vinyltrifluoro acetate, and vinylpentafluoro propionate; polymerizable substituted allyls such as allyl acetate, allyl acetonitrile, allylalcohol, allylamine, diallyl acetate, triallylamine, allylcyanide, diallylether, allylethyl ether, and allyltolyl ether; fumaric esters such as dimethyl fumarate, diethyl fumarate, dibutyl fumarate, diphenyl fumarate, and diamyl fumarate; the maleic esters such as dimethyl maleate, diethyl maleate, dipropyl maleate, dibutyl maleate, diamyl maleate, and diphenyl maleate; unsaturated aldehydes such as (meth)acrolein, chloro(meth)acrolein, and crotonic aldehydes; unsaturated ketones such as methylvinyl ketone, and ethylvinyl ketone; unsaturated lactams such as vinyl pyrrolidone; unsaturated amines such as dimethylvinyl amine, and diethylvinyl amine; unsaturated nitrils such as (meth)acrylonitrile, and cyanovinylidene. Of these one or more members may be used.

The ratio of silicone macromer (am) :alkylene oxide chain-containing macromer (bm-1): crosslinking monomer having two more double bonds therein (cx) :optional (dx) in the monomer mixture (X) is preferably, by weight, 10-89.9%:10-89.9%:0.1-50%:0-79.9%, providing the sum of the components used is 100%.

In producing the composite by method (1-1), monomer mixture (X) may be precipitation-polymerized using a known radical generating catalyst.

The meaning of precipitation-polymerization of method (1-1) is that a monomer mixture (X) dissolved together with an organic solvent, and then polymerized using a radical generating catalyst to give rise to a polymer insoluble in the solvent. In method (1-1), an alcohol solvent is preferably used After polymerization, a post treatment may be carried out such as re-preparation, solvent replacement, solvent distillation, drying, or grinding. In particular, when the used polymerization solvent is replaced with a silicone oil to form a silicone oil dispersion of the composite of the present invention, the workability for regulating the electrorheological fluids is improved.

The proportion of the composite obtained by method (1-1) is preferably 0.1-30 parts by weight, more preferably 1-20 parts by weight, based on 100 parts by weight of the dispersed phase. If the proportion is not more than 0.1 parts by weight, the electrorheological fluid has poor dispersion stability. Adversely, if the proportion is not less than 30 parts by weight, the electrorheological fluid has an appropriate dispersion stability in proportion to the added amount, and has a higher viscosity under the condition of no electric field.

Method (2)

When produced according to method (2), the composite is substantially insoluble in the insulating liquid due to the presence of particle (I) therein.

In producing the composite of the present invention by method (2), there are used, for instance, the following five methods, i.e. (2-1) a method whereby a monomer mixture (Y) is polymerized to obtain a polysiloxane-containing polymer (II), and then in the presence of the resultant polysiloxane-containing polymer (II), a polymerizable monomer (α) capable of providing particle (I) is dispersion-polymerized in a solvent which dissolves the polymerizable monomer (α) and does not dissolve the generated polymer (particle (I)), (2-2) a method wherein a monomer mixture (Y) is polymerized to obtain a polysiloxane-containing polymer (II), and then in the presence of the resultant polysiloxane-containing polymer (II) polymerizable monomer (α)is emulsion-polymerized in an aqueous solvent, (2-3) a method wherein a monomer mixture (Y) is polymerized in the presence of particle (I) to give rise to polysiloxane-containing polymer (II), (2-4) a method wherein a monomer mixture (Y) is polymerized in the presence of particle (I), in particular, an organic or inorganic particle in which a condensation-reactive or addition-reactive group is introduced, to produce polymer (II), and (2-5) a method wherein a monomer mixture (Y)is polymerized in the presence of particle (I), in particular, an organic or inorganic particle as particle (I) in which a polymerizable group is introduced, to produce polymer (II). In view of the reproducibility of the composite in which polymer (II) is fixed onto particle (I), methods (2-1), (2-2) and (2-5) are preferred.

Methods (2-1), (2-2) and (2-5) will be explained in more detail.

Method (2-1)

Method (2-1) relates to a method wherein monomer mixture (Y) is polymerized to obtain polysiloxane-containing polymer (II), and then in the presence of the resultant polysiloxane-containing polymer (II), polymerizable monomer (α) capable of giving particle (I) is dispersion-polymerized in a solvent which dissolves polymerizable monomer (α) and does not dissolve the generated polymer (particle (I)).

In adopting method (2-1), polysiloxane-containing polymer (II) is obtained preferably by polymerizing a monomer mixture (Y) containing silicone macromer (am) represented by the aforementioned formula 5 (supra), at least one dispersed phase adsorbing chain-containing monomer (by) selected from the group consisting of alkylene oxide chain-containing macromer (bm-1) represented by the aforementioned formula 6 (supra), a nitrogen atom chain-containing monomer (b-2) represented by the following formula 7:

wherein J is

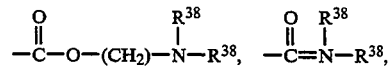

—CN, or a substitute having a nitrogen heterocyclic ring, $R^{37}$ a hydrogen atom or methyl group, $R^{38}$ a hydrogen atom or an alkyl group, n an integer of 2-6, and a long hydrocarbon chain-containing monomer (b-3) represented by the following formula 8:

wherein K is —COO— or a phenylene group, $R^{39}$ a hydrogen atom or methyl group, and $R^{40}$ an alkyl group of 4-30 carbon atoms, and an optional (dy).

The ratio of silicone monomer (am) is preferably 10-90%, and most preferably 20-80% by weight, based on the weight of monomer mixture (Y). If the proportion of silicone monomer (am) is not more than 10% by weight or not less than 90% by weight, the electrorheological fluid does not have dispersion stability and fluidity. The ratio of dispersed phase adsorbing chain-containing monomer (by) is preferably 10-90%, and most preferably 20–80% by weight, based on the weight of monomer mixture (Y). If the proportion of monomer (by) is not more than 10% by weight or not less than 90% by weight, the electrorheological fluid does not have full dispersion stability properties.

As nitrogen atom-containing monomer (b-2), there are cited monomers including one or more basic nitrogen atoms and an ethylenically unsaturated bond. Examples of nitrogen atom-containing monomer (b-2) are, but not limited to, nitrogen-containing (meth)acrylic acid derivatives, (meth)acrylonitrile, and unsaturated monomers containing a nitrogen heterocyclic ring.

As the nitrogen-containing (meth)acrylic acid derivatives, there are cited, for instance, modified (meth)acrylic esters in which the ester portion includes a substituted or non substituted amino group, and (meth)acrylic acid amide, preferably aminoalkyl (meth)acrylate and (meth)acrylic acid amide. Examples of aminoalkyl (meth)acrylate are N,N-dimethyl amino ethyl (meth)acrylate, N,N-diethyl amino ethyl (meth)acrylate, N,N-dimethyl amino propyl (meth)acrylate, and N,N-dimethyl amino butyl (meth)acrylate or the like. Examples of (meth)acrylic acid amide are (meth)acrylamide, N-(meth)acrylamide, N-ethyl (meth)acrylamide, N-butyl (meth)acrylamide, N, N-dimethyl (meth)acrylamide, N, N-diethyl (meth) acrylamide, N, N-dimethyl propyl acrylamide or the like. Of these one or more members may be used, and in particular preferably a tertiary amine containing compound.

As the unsaturated monomers containing a nitrogen heterocyclic ring, there are cited, for instance, monomers in which a hetrocyclic ring made of a single ring or multiple rings including one to three, preferably one or two nitrogen atoms, bonds to a vinyl group. Examples of these monomers are vinyl pyrrolidones such as 2-vinyl-2-pyrrolidone, and 1-vinyl-3-pyrrolidone; vinyl pyridines such as 2-vinyl pyridine, 4-vinyl pyridine, and 5-methyl-2-vinyl pyridine; vinylimidazoles such as 1-vinyl imidazole, and 1-vinyl-2-methyl imidazole; N-(meth)acryloyl morpholine or N-(meth)acryloyl pyridine or the like. Of these one or more members may be used.

As the long hydrocarbon chain-containing monomer (b-3), there are cited, for instance, (meth)acrylic esters such as butyl (meth)acrylate, octyl (meth)acrylate, 2-ethylhexyl (meth)acrylate, dodecyl (meth)acrylate, cetyl (meth)acrylate, stearyl (meth)acrylate, 2-methylstearyl (meth)acrylate, and eicosyl (meth)acrylate; or long chain alkyl group substituted styrenes such as butyl styrene, octyl styrene, dodecyl styrene, and stearyl styrene. Of these one or more members may be used.

As the optional (dy), there are cited, for instance, polymerizable monomers of olefins such as ethylene, propylene, and cyclohexene; alkyldienes such as butadiene, isoprene, and cyclopentadiene; halogenated olefins such as vinyl fluoride, vinylidene fluoride, vinyl chloride, and vinylidene chloride; aromatic vinyl compounds such as styrene, α-methyl styrene, p-methyl styrene, vinyl naphthalene, vinyl anthracene, chlorostyrene, and chloromethyl styrene; (meth)acrylic esters such as methyl (meth)acrylate, and ethyl (meth)acrylate; (meth)acrylic alkoxy alkyl esters such as methoxy ethyl (meth)acrylate; (meth)acrylic hydroxyl alkyl esters such as 2-hydroxyl ethyl (meth)acrylate, and hydroxyl butyl (meth)acrylate; esters made from an aromatic alcohol and (meth)acrylate such as benzyl (meth)acrylate; additives of glycidyl (meth)acrylate or (meth)acrylic hydroxy alkyl ester and a monocarboxylic acid having 2–18 carbon atoms such as acetic acid, propionic acid, lauric acid, linoleic acid, and p-tert-benzoic acid; fluorine-containing compounds such as VISCOAT8F, VISCOAT8FM (products, (meth)acrylates containing a fluorine atom, sold by Osakayukikagaku Kabushiki Kaisha in Japan), (meth)acrylic perfluoro cyclohexyl, and perfluoro cyclohexyl ethylene; vinyl esters such as vinyl benzoate; polymerizable unsaturated group-containing sulfonic acids such as vinyl sulfonic acid, allyl sulfonic acid, styrene sulfonic acid, 2-acrylamide-2-methyl propane sulfonic acid, 2-sulfoethyl (meth)acrylate, and 3-sulfopropyl (meth)acrylate; or polymerizable unsaturated group-containing carboxylic acid such as acrylic acid, methacrylic acid, crotonic acid, itaconic acid, maleic acid, fumaric acid, and citraconic acid or salts thereof, the salt being sodium, calcium, ammonium, and pyridinium or the like.

In method (2-1), use of a silicone insulating oil as the dispersing medium is preferred. When the composite is dispersed in the silicone insulating oil, the electrorheological fluid has excellent fluid properties.

Polysiloxane-containing polymer (11) is produced by a known procedure, e.g. solution polymerization using a radical generating catalyst.

As the radical generating catalyst, there are cited, for instance, conventional catalysts for the polymerization of vinyl monomers. Examples of the radical generating catalyst are, but not limited to, azo compounds such as 2,2'-azobisisobutyronitrile, and 2,2'-azobis (2,4-dimethylvaleronitrile); and per-oxide compounds such as benzoyl peroxide, di-tert-butyl peroxide, tert-butyl perocctate, and tert-butylperoxy-2-ethylhexanoate. The amount of the radical generating catalyst to be added is usually 0.2–10 parts by weight, preferably 0.5–5 parts by weight, based on 100 parts of the monomer used.

The reaction temperature of polymerization is usually 60°–100° C. for 1 to 15 hours.

In the polymerization, a solvent may be used. Examples of the solvent are, but not limited to, aliphatic hydrocarbons such as hexane, heptane, and octane; aromatic hydrocarbons benzene, toluene, and xylene; alcohols such as isopropyl alcohol, and butanol; ketones such as methyl isobutyl ketone, and methyl ethyl ketone; esters such as ethyl acetate, isobutyl acetate, amyl acetate, 2-ethyl hexyl acetate; and Cellosolve such as methyl cellosolve, and ethyl cellosolve.

Polymer (II) preferably has an ethylenically unsaturated group, which is introduced by the reaction of a monomer with an ethylenically unsaturated group.

When polymer (II) having an ethylenically unsaturated group is used, due to the formation of chemical bond between polymerizable monomer (α) (particle (I)) and polymer (II), then the electrorheological fluids have improved the dispersion stability during storage and the dispersion stability after the use for a long period time under conditions of high shear stress.

The introduction of an ethylenically unsaturated group into polymer (II) is carried out, for instance, by adopting, as a component of a monomer mixture (Y), an acid group-containing monomer such as acrylic acid, methacrylic acid, maleic acid, and vinyl sulfonic acid to form the precursor of polymer (II), and then reacting with the acid group of the precursor a glycidyl group-containing unsaturated monomer such as glycidyl (meth)acrylate or allyl glycidyl ether.

In addition to the above, a composite in which particle (I) is chemically bonded with polysiloxane-containing polymer (II), is more preferred. By adopting the above chemical bonding, a suitable composite for the present invention can be easily obtained.

The composite is then produced by dispersion-polymerizing polymerizable monomer ($\alpha$) in the presence of polymer (II). The meaning of dispersion polymerization of method (2-1) is polymerization carried out in the presence of a dispersion stabilizing agent using an organic solvent capable of dissolving polymerizable monomer ($\alpha$) and not capable of dissolving the resultant polymer. In particular, the organic solvent is capable of dissolving both of polymer (II) and polymerizable monomer ($\alpha$) and substantially not capable of dissolving the resultant composite. Examples of the organic solvent are, but not limited to, aliphatic hydrocarbons such as hexane, heptane, and octane; aromatic hydrocarbons such as benzene, toluene, and xylene; alcohols such as methyl alcohol, ethyl alcohol, isopropyl alcohol, and n-butyl alcohol; ethers such as cellosolve, butylcellosolve, and diethylene glycol monobutyl ether; esters such as ethyl acetate, and isobutyl acetate; and ketones and the like. Of these one or more members may be used.

As polymerizable monomer ($\alpha$), there are cited, for instance, aromatic compounds such as styrene, vinyl toluene, vinyl p-chlorotoluene, and vinyl pyridine; and (meth)acrylic acid esters such as methyl (meth)acrylate, ethyl (meth)acrylate, propyl (meth)acrylate, and benzyl (meth)acrylate.

The dispersion polymerization for synthesizing the composite to be used in the electrorheological fluid of the present invention is carried out usually using a radical generating catalyst. Examples of the radical generating catalyst are, but not limited to, azo compounds such as 2,2'-azobisisobutyronitrile, and 2,2'-azobis(2,4-dimethylvaleronitrile); and peroxides such as benzoyl peroxide, and lauroyl peroxide. The amount of the catalyst is usually 0.2–10 parts by weight, preferably 0.5–5 parts by weight, based on 100 parts by weight of polymerizable monomer (a).

The proportion of polymer (II) is preferably 0.1–10 parts by weight, more preferably 1–6 parts by weight, to 100 parts by weight of polymerizable monomer (a). If the proportion of polymer (II) is not more than 0.1 part by weight, the polymerization for producing the composite are not reproducible and if obtained, the dispersion stability of electrorheological fluid is poor. Adversely, if the proportion is not less than the 10 parts by weight, the resultant electrorheological fluid is liable to be poor in re-dispersibility and fluidity properties.

The total concentration of polymerizable monomer (a) and polymer (II) in the reaction mixture is usually 5–50% by weight, preferably 10–30% by weight. Further, a conventional surfactant or a dispersion stabilizer such as high polymers may be added.

The dispersion polymerization may be carried out usually at 60°–100° C. and for 0.5–30 hours. After polymerization, a post treatment may be carried out for solvent replacement, solvent distillation, drying, and grinding. When the polymerization solvent used is replaced with a silicone insulating oil, the workability of producing electrorheological fluid is improved.

In producing electrorheological fluid of the present invention, the amount of the composite as the additive is usually 0.1–10 parts by weight, preferably 0.5–5 parts by weight, based on 100 parts by weight of the dispersed phase. If the amount is not more than 0.1 part by weight, the resultant electrorheological fluid does not have good dispersion stability and re-dispersibility properties. Adversely, if the weight is not less than 10 parts by weight, the electrorheological fluid does not have a dispersion stability in proportion to the amount added, or has poor fluidity.

Method (2:2)

Method (2-2) relates to a method that monomer mixture (Y) is polymerized to obtain polysiloxane-containing polymer (II), and then in the presence of the resultant polysiloxane-containing polymer (II) polymerizable monomer ($\alpha$) is emulsion-polymerized in an aqueous solvent.

Method (2-2) is carried out by emulsion-polymerizing polymerizable monomer ($\alpha$) in the presence of polymer (II) using an aqueous solvent. The emulsion polymerization is preferred using a radical generating catalyst soluble in water. The radical generating catalyst is a conventional one for emulsion polymerization of vinyl monomers. Examples of the radical generating catalyst are, but not limited to, sodium persulfate, potassium persulfate, ammonium persulfate, 4,4'-azobis-4-cyanovaleric acid, and 2,2'-azobis-aminopropane hydrochloric acid salt.

The proportion of polymer (II) is preferably 0.1–10 parts by weight, more preferably 1–6 parts by weight, based on 100 parts by weight of polymerizable monomer ($\alpha$) used. If the proportion is not more than 0.1 part by weight, the polymerization for producing the composite is reproducible, and the if obtained electrorheological fluid does not have a sufficient dispersion stability. Adversely, if the proportion is not less than 10 parts by weight, the electrorheological fluid has poor re-dispersibility and fluidity.

The total concentration of polymerizable monomer ($\alpha$) and polymer (II) is preferably 5–50% by weight, more preferably 10–30% by weight, based on the weight of the aqueous solvent used.

As the aqueous solvent, there are cited, for instance, water, and a mixture of water and an organic solvent having a high affinity to water, e.g. alcohols such as methanol, ethanol, and isopropanol; Cellosolve such as methylcellosolve, and ethylcellosolve; glycols such as ethylene glycol, and diethylene glycol. When the mixture is used as the solvent, it is preferred for polymerizable monomer ($\alpha$) not to dissolve into the solvent.

The polymerization may be carried out at 50°–100° C. for 2–40 hours.

The procedure of polymerization is carried out by charging water and polymer (II) into a reactor, mixing the resultant mixture to form an uniform dispersion, adding a part or whole of polymerizable monomer ($\alpha$) into the dispersion, regulating the temperature of the dispersion, and adding a radical generating catalyst into the regulated dispersion to start polymerization. The polymerization is carried out in the emulsified state at a prescribed temperature by adding the residual polymerizable monomer ($\alpha$), if present. After polymerization, a post treatment may be carried out for solvent replacement, solvent distillation, drying and grinding.

The other matters and compounds not explained are the same as described in Method (2-1).

Method (2-5)

Method (2-5) relates to a method in which monomer mixture (Y) is polymerized in the presence of an organic or inorganic particle as particle (I) in which a polymerizable group is introduced, to produce polymer (II).

Particle (I) may be an organic or inorganic fine particle with a polymerizable group. The fine particle is produced, for instance, by treating an organic or inorganic fine particle with (e) a compound having both polymerizable group and reactive group capable of reacting with the functional group present in the surface of the organic or inorganic fine particle. Examples of particle (I) are, but not limited to, an organic particle such as polystyrene, poly(meth)acrylate, polyacrylonitrile, phenol resin, benzoguanamine resin, melamine resin; an inorganic particle such as silica and alumina; an organic or inorganic particle which has a reactive group of condensation or addition such as hydroxyl, amino, carboxyl, epoxy, or isocyanate group; and an organic or inorganic particle which has a polymerizable group such as styryl and (meth)acryloyl group. Examples of compound (e) are, but not limited to, vinyl group-containing silane coupling agents such as γ-(meth)acryloxy propyl trimethoxy silane, vinyl trimethoxy silane, vinyl triethoxy silane, and vinyl trichloro silane; and glycidyl group-containing unsaturated compounds such as glycidyl (meth)acrylate, and allyl glycidyl ether.

The amount of compound (e) is usually 10-100 parts by weight, based on 100 parts by weight of the organic or inorganic fine particle used.

The polymerization of monomer mixture (Y) for producing the composite may be carried out using a polymerization initiator in the presence of particle (I) which has a polymerizable group thereon in an organic solvent.

Examples of the organic solvent are, but not limited to, aliphatic hydrocarbons such as hexane, heptane, and octane; aromatic hydrocarbons such as benzene, toluene, and xylene; alcohols such as methyl alcohol, ethyl alcohol, isopropyl alcohol, and n-butyl alcohol; ethers such as methyl cellosolve, ethyl cellosolve, butyl cellosolve, diethylene glycol monobutyl ether; esters such as ethyl acetate, and isobutyl acetate; and ketones. Of these one or more members may be used.

The polymerization initiator may be peroxide initiators such as benzoyl peroxide, and lauroyl peroxide; azo initiators such as 2,2'-azobisisobutyronitrile, 2,2'-azobis (2,4'-dimethyl valeronitrile).

The mentioned polymerization may be carried out at 50°-100° C. for 0.5-15 hours. After polymerization, a post treatment may be carried out for solvent replacement, solvent distillation, drying and grinding.

The other matters and compounds not explained are the same as described in method (2-1).

The electrorheological fluid of the present invention may be produced by mixing and dispersing the dispersed phase of dielectric particle with the dispersing medium in the presence of the additive of several kinds of composite. The ratio of the dispersed phase to the dispersing medium is preferably 100 parts by weight:-50-500 parts by weight. If the ratio is not less than 500, the electrorheological fluid has the disadvantage in that the generating shear stress when an electric field is applied, does not increase. Adversely, if the ratio is not more than 50, the electrorheological fluid has poor fluidity properties.

In addition, in order to regulate viscosity or improve shear stress, a conventional additive such as high polymer dispersing agents, surfactants, high polymer viscous agents, and fine particles or the like may be added into the electrorheological fluid of the present invention.

EXAMPLE

The present invention is explained in more detail with reference to the following examples, but the aspect of the present invention is not defined by those examples.

Synthetic Example 1

In a 1,000 ml, four-necked flask provided with a stirrer, a reflux condenser, a thermometer, and a nitrogen gas introducing port, 567 g of isopropyl alcohol, 6 g of azo-bis-isobutyronitrile, 10 g of methacryloyl group-containing methoxy poly(ethylene glycol) as the alkylene oxide chain-containing macromer (bm-1) (a product of Shin-Nakamura Chemical Co., Ltd. in Japan having a polymerization degree of poly(ethylene glycol) moiety, n, of about 23 and an average molecular weight of about 1,100, and marked under trademark designation of "NK ester M-230G"), 20 g of Industrial divinyl benzene (a mixture of 55% by weight of divinylbenzene as a cross-linking monomer, 35% by weight of ethyl styrene, etc. produced by Wako Pure Chemical Industries Ltd.) as crosslinking monomer (cx), 30 g of methacryloyl group-containing poly(dimethyl siloxane) as the silicone macromer (am) (a product of Chisso Corporation having an average molecular weight of about 5,000 and marked under trademark designation of "Sairapurehn FMO721"), and 40 g of styrene as optional (dx) were placed and stirred at normal room temperature for 30 minutes and kept swept with nitrogen. The resultant mixture was subjected to a polymerization reaction by 20 hours' heating at 65° C. and four hour's heating at 83° C. By the determination of the non-volatile content of the produced reaction solution, the conversion of the monomer was found to be 100%. A silicone oil dispersion of a composite (I) (having the composite (I) content of 20% by weight; hereinafter referred to as "additive dispersion (1)") was obtained by adding dropwise 400 g of silicone oil (a product sold by Shi-etsu Chemical Industry Co., Ltd. and marked under product code of "KF96-20cs") to the reaction solution and heating the produced mixture under a decreased pressure in an evaporator thereby expelling the volatile content by distillation.

Synthetic Example 2

567 g of isopropyl alcohol, 5 g of azobisisobutyronitrile, 60 g of methacryloyl group-containing polydimethyl siloxane "Sairapurehn FMO725" (supra) as the silicone macromer (am), 30 g of methacryloyl group-containing polyethylene glycol polytetra ethylene glycol (a product sold under the trade name of "Burenmah 55PET-800" by Nippon Oils & Fats Co., Ltd., an average molecular weight of about 900) as the alkylene oxide chain-containing macromer (bm-1), and 10 g of Industrial divinyl benzene (supra) as the crosslinking monomer (cx) were charged into a 1,000 ml, four necked flask equipped with a stirrer, reflux condenser, a thermometer, and a nitrogen gas introducing port. With the introduction of nitrogen gas, stirring was carried out at room temperature for 30 minutes. After heating to 65° C., additional heating continued for 20 hours, and then continued at 83° C. for four hours to carry out polymerization.

To the reaction solution, were added 392 g of silicone oil "KF 96-20 cs" (supra). The resultant mixture was subjected to a heat treatment using an evaporator under a reduced pressure to remove the volatile and to give rise to a silicone oil dispersion of composite (2) (having composite (2) content of 20% by weight; hereinafter being referred to as "additive dispersion (2)").

Synthetic Example 3

150 g of toluene, 1 g of azobisisobutyronitrile, 50 g of methacryloyl group containing polydimethyl siloxane "Sairapurehn FMO721" (supra) as the silicone macromer (am), and 50 g of methacryloyl group-containing methoxy polyethylene glycol "NK ester M-230G" (supra) as the dispersed phase adsorbing chain-containing macromer (bm) were charged into a 500 ml, four necked flask equipped with a stirrer, a reflux condenser, a thermometer and a nitrogen gas introducing port. With the introduction of nitrogen gas, stirring was carried out at room temperature for 30 minutes. Polymerization was carried out by heating the mixture at 80° C. for two hours. After polymerization, the reaction solution was subjected to a heat treatment using an evaporator under a reduced pressure to remove the solvent used to give rise to an oily polysiloxane-containing polymer (hereinafter referred to as "Polymer (1)").

350 g of isopropyl alcohol, 2.5 g of Polymer (1), 1.5 g of azobisisobutyronitrile, and 50 g of styrene as the polymerizable monomer ($\alpha$) were charged into a 500 ml, four necked flask equipped with a stirrer, a reflux condenser, a thermometer, and a nitrogen gas introducing port. With the introduction of nitrogen gas, stirring continued at room temperature for 30 minutes. Polymerization was carried out at 70° C. for 24 hours. To the reaction solution, was added 200 g of silicone oil "KF 96-20cs" (supra). The resultant mixture was subjected to a heat treatment using an evaporator under a reduced pressure to remove the volatiles and to give rise to a silicone oil dispersion of composite (3) (having composite (3) content of 20% by weight; hereinafter referred to as "additive dispersion (3)").

Synthetic Example 4

150 g of toluene, 1 g of azobisisobutyronitrile, 40 g of methacryloyl group-containing polydimethyl siloxane "Sairapurehn FMO721", (supra) as the silicone macromer (am), and 60 g of dodecyl methacrylate as the dispersed phase adsorbing chain-containing monomer (by) were charged into a 500 ml, four necked flask equipped with a stirrer, a reflux condenser, a thermometer, and a nitrogen gas introducing port. Stirring was carried out for 30 minutes while a nitrogen gas was introduced. Polymerization was carried out at 75° C. for three hours. After polymerization, the solvent used was removed by heat treatment using an evaporator under a reduced pressure to give rise to an oily Polymer (2).

350 g of isopropyl alcohol, 2 g of Polymer (2), 1 g azobisisobutyronitrile, and 50 g of styrene as polymerizable monomer ($\alpha$) were charged into a 500 ml, four necked flask equipped with a stirrer, a reflux condenser, a thermometer, and a nitrogen gas introducing port. Stirring was carried out at room temperature for 30 minutes while a nitrogen gas was introduced. Polymerization was carried out at 70° C. for 15 hours. To the reaction solution, were charged 200 g of silicone oil "KF 96-20cs" (supra), and the resultant mixture was subjected to heat treatment using an evaporator under a reduced pressure to remove the volatiles to give rise to a silicone oil dispersion of composite (4) (having composite (4) content of 20% by weight; hereinafter referred to as "additive dispersion (4)").

Synthetic Example 5

200 g of toluene, 1 g of benzoyl peroxide, 60 g of tris(trimethylsiloxy) silylpropyl methacrylate (a product, under the tradename of X-22-5002, sold by Shinetsu Chemical Industry Co., Ltd. in Japan; average molecular weight of about 422) as the silicone macromer (am), 30 g of butyl acrylate as the dispersed phase adsorbing chain-containing monomer (by), and 10 g of styrene as optional (dy) were charged into a 500 ml, four necked flask equipped with a stirrer, a reflux condenser, a thermometer, and a nitrogen gas introducing port. With the introduction of nitrogen gas, stirring was carried out at room temperature for 30 minutes. Polymerization was carried out at 70° C. for 24 hours. After polymerization, the solvent used was distilled out by heating using an evaporator under a reduced pressure to give rise to an oily Polymer (3).

350 g of hexane, 2.5 g of Polymer (3), 1 g of azobisisobutyronitrile, 40 g of methyl methacrylate, and 10 g of benzyl methacrylate as polymerizable monomer ($\alpha$) were charged into a 500 ml, four necked flask equipped with a stirrer, a reflux condenser, a thermometer, and a nitrogen gas introducing port. With the introduction of nitrogen gas, stirring was carried out at room temperature for 30 minutes. Polymerization was carried out at 70° C. for 20 hours. To the resultant reaction solution, were added 200 g of silicone oil "KF 96-20cs (supra). The resultant mixture was reduced using an evaporator to vaporize the volatile components to give rise a silicone dispersion of composite (5) (having composite (5) content of 20% by weight; hereinafter referred to as "additive dispersion (5)").

Synthetic Example 6

200 g of toluene, 3 g of azobisisobutyronitrile, 50 g methacryloyl group-containing polydimethyl siloxane "Sairapurehn FM0721" (supra) as silicone macromer (am), 45 g of dodecyl methacrylate as dispersed phase adsorbing chain-containing monomer (by), and 5 g of methacrylic acid as optional (dy) were charged into a 500 ml, four necked flask equipped with a stirrer, a reflux condenser, a thermometer, and a nitrogen gas introduction port. While introducing nitrogen gas, stirring was carried out at room temperature for 30 minutes. Polymerization was carried out at 80° C. for two hours. After the further addition of 5 g of glycidyl methacrylate and 1 g dimethylaminoethanol, reaction was carried out at 100° C. for 5 hours. After reaction, the used solvent was heated using an evaporator under a reduced pressure to give rise to an oily Polymer (4).

350 g of isopropyl alcohol, 2 g of Polymer (4), 2 g of azobisisobutyronitrile, and 50 g of styrene as polymerizable monomer ($\alpha$) were charged into a 500 ml, four necked flask equipped with a stirrer, a reflux condenser, a thermometer, and a nitrogen gas introducing port. While introducing nitrogen gas, stirring was carried out at room temperature for 30 minutes. Polymerization was carried out at 70° C. for 24 hours. After the addition of 200 g of silicone oil "KF96-20cs" (supra) into the reaction solution, the volatile components were removed by heating with an evaporator under a reduced pressure to give rise to a silicone oil dispersion of composite (6) (having composite (6) content of 20% by weight; hereinafter referred to as "additive dispersion (6)").

Synthetic Example 7

200 g of toluene, 3 g of azobisisobutyronitrile, 50 g of methacryloyl group-containing polydimethyl siloxane "Sairapurehn FM0721" (supra) as the silicone macromer (am), and 50 g of diethylaminoethyl methacrylate as the dispersed phase adsorbing chain-containing monomer (by) were charged into a 500 ml, four necked flask equipped with a stirrer, a reflux condenser, a thermometer, and a nitrogen gas introducing port. While introducing nitrogen gas, stirring was carried out at room temperature for 30 minutes. Polymerization was carried out at 70° C. for 3 hours. After polymerization, the used solvent was removed by heating using an evaporator under a reduced pressure to give rise to an oily Polymer (5).

350 g of isopropyl alcohol, 2 g of Polymer (5), 2 g of azobisisobutyronitrile, and 50 g of styrene as polymerizable monomer (α) were charged into a 500 ml, four necked flask equipped with a stirrer, a reflux condenser, a thermometer, and a nitrogen gas introducing port. While introducing nitrogen gas, stirring was carried out at room temperature for 30 minutes. Polymerization was carried out at 70° C. for 24 hours, After the addition of 200 g of silicone oil "KF 96-20cs" (supra) into the reaction mixture, the volatile components were removed by heating using an evaporator under a reduced pressure to give rise to a silicone oil dispersion of composite (7) (having composite (7) content of 20% by weight; hereinafter referred to as "additive dispersion (7)").

Synthetic Example 8

400 g of tetrahydrofuran, 20 g of methacryloyl group-containing polydimethyl siloxane "Sairapurehn FM0721" (supra) as the silicone macromer (am), 20 g of diethylaminoethyl methacrylate as the dispersed phase adsorbing chain-containing monomer (by), 1 g of azobisisobutyronitrile, and 100 g of deionized water containing 10% by weight of sodium styrene sulfonate were charged into a 500 ml, four necked flask equipped with a stirrer, a reflux condenser, a thermometer, and a nitrogen gas introducing port. While introducing nitrogen gas, stirring was carried out at room temperature for 30 minutes. Polymerization was carried out at 75° C. for 3 hours. After polymerization, the used solvent was removed by heating using an evaporator under a reduced pressure to give rise to a Polymer (6).

200 g of deionized water, 2 g of Polymer (6), 1 g of sodium persulfate, and 40 g of styrene as polymerizable monomer (a) were charged into a 500 ml, four necked flask equipped with a stirrer, a reflux condenser, a thermometer, and a nitrogen gas introducing port. While introducing nitrogen gas, stirring was carried out at 20,000 r.p.m. for 2 minutes. The stirred mixture was heated at 70° C. for 3 hours and further at 90° C. for 3 hours to polymerize. After polymerization, the used solvent of water was changed to isopropyl alcohol by azeotropic distillation. After the addition of 200 g of Electric insulating oil containing mineral hydrocarbon as the main component (a high voltage insulating oil sold by Cosmo Oil Co., Ltd. in Japan) into the resultant mixture, the. isopropyl alcohol used as the solvent was removed under a reduced pressure to give rise to a mineral electric insulating dispersion of additive (8) being made from a polystyrene composite (having additive (8) content of 20% by weight; hereinafter referred to as "additive dispersion (8)").

Synthetic Example 9

200 g of tetrahydrofuran, 20 g of methacryloyl group-containing polydimethyl siloxane "Sairapurehn FM0721" (supra) as the silicone macromer (am), 20 g of acrylonitrile as the dispersed phase adsorbing chain-containing monomer (by), 5 g of methacrylic acid and 5 g of glycidyl methacrylate as optional (dy), 1 g of azobisisobutyronitrile, and 150 g of deionized water containing 10% by weight of sodium 2-acrylamide-2-methyl propane sulfonate were charged into a 500 ml, four necked flask equipped with a stirrer, a reflux condenser, a thermometer, and a nitrogen gas introducing port. While introducing nitrogen gas, stirring was carried out at room temperature for 30 minutes. Polymerization was carried out at 75° C. for 3 hours. After polymerization, the volatile components were removed by heating using an evaporator to give rise to a Polymer (7).

200 g of deionized water, 2 g of Polymer (7), 1 g of sodium persulfate, and 50 g of methyl methacrylate as polymerizable monomer (α) were charged into a 500 ml, four necked flak equipped with a stirrer, a reflux condenser, a thermometer, and a nitrogen gas introducing port. While introducing nitrogen gas, stirring was carried out at 20,000 r.p.m. using the dispersion device for 2 minutes. The resultant mixture was heated at 70° C. for 3 hours, and further heated at 90° C. for 3 hours to polymerize. After polymerization, the used solvent of water was changed to isopropyl alcohol by azeotropic distillation. To the resultant mixture, was charged 200 g of Electric insulating oil containing mineral hydrocarbon as the main component "high voltage insulating oil" (supra). The isopropyl alcohol was removed under a reduced pressure to give rise to a mineral electric insulating oil dispersion of additive (9) being made of a poly methylmethacrylate (having additive (9) content of 20% by weight; hereinafter referred to as "additive dispersion (9)").

Synthetic Example 10

150 ml of methanol, 50 ml of deionized water, and 10 g of Spherical silica fine particle (a truly fine particle sold by Nippon Shokubai Co., Ltd.; average particle diameter=1 μm) were charged into a 300 ml flask. Further the addition of 5 g of γ-(methacryloxy propyl) trimethoxy silane, reaction was carried out at 40° C. for 2 hours to introduce the methacryloyl group onto the surface of the spherical silica fine particle. The resultant mixture was subjected to a reduced distillation of the used solvent using an evaporator, and then dried at 50° C. using a vacuum dryer. 15 g of the resultant product, and 150 ml of toluene were charged into a 200 ml flask to disperse the resultant product. To the dispersion, were added 0.1 g of azobisisobutyronitrile, 0.75 g of methacryloyl group-containing polydimethyl siloxane "Sairapurehn FMO721" (supra) as the silicone macromer (am), and 0.75 g of methacryloyl group-containing methoxy polyethylene glycol "NK ester M-230G" (supra) as the dispersed phase adsorbing chain-containing monomer (by). The reaction was carried out at 70° C. for 5 hours. To the reaction solution, was added 66 g of silicone oil "KF 96-20cs" (supra). The volatile components were distilled out under a reduced pressure using an evaporator to give rise to a silicone oil dispersion of composite (10) (having composite content (10) of 20% by weight; hereinafter referred to as "additive dispersion (10)").

Synthetic Example 11

150 ml of methanol, 50 ml of deionized water, and 10 g of Spherical silica fine particle (average particle diameter 1 μm) (supra) were charged into a 300 ml flask to disperse the Spherical silica fine particle. Further the addition of 5 g of γ-(methacryloxy propyl) trimethoxy silane, reaction was carried out at 40° C. for 2 hours to introduce the methacryloyl group onto the surface of the Spherical silica fine particle. The mixture was then treated using an evaporator to distillate out the used solvent, and dried at 50° C. with a vacuum dryer. 15 g of the resultant product, and 150 ml of toluene were charged into a 200 ml flask to form a dispersion. To the dispersion, were added 0.1 g of azobisisobutyronitrile, 0.6 g of methacryloyl group-containing polydimethyl siloxane "Sairapurehn FMO721" (supra) as the silicone macromer (am), and 0.9 g of dodecyl methacrylate as the dispersed phase adsorbing chain-containing monomer (by). The reaction was carried out at 70° C. for 5 hours. After the addition of 66 g of silicone oil "KF 96-20cs" (supra), the volatile components were distilled out under a reduced pressure to give rise to a silicone oil dispersion of composite (11) (having composite (11) of 20% by weight hereinafter referred to as "additive dispersion (11)").

Synthetic Example 12

To a 1 liter, four necked, separable flask equipped with a biomixer, a reflux condenser and a thermometer, were charged 480 ml of water, and 6.4 g of Poval PVA-205 (a polyvinyl alcohol sold by Kuraray Co., Ltd. in Japan) to dissolve, and then additionally added a mixture of 110 g of methyl methacrylate, 10 g of Industrial divinyl benzene (supra), and 3 g of azobisisobutyronitrile. The content in the flask was dispersed using the dispersion device at 20,000 r.p.m. and polymerization was carried out at 70° C. for 8 hours. The resultant solids were separated, thoroughly washed with water, and dried using a hot air dryer at 80° C. for 12 hours to give rise to a 115 g of a spherical, polymerized, cross-linked fine particle.

100 g of the above mentioned spherical, polymerized, crosslinked fine particle and 400 g of methanol solution containing 10% by weight of sodium hydroxide were charged into a 1 liter, three necked, separable flask to disperse. The reaction mixture was heated to 70° C., maintained at the same temperature for 24 hours while stirring to saponify. The saponified mixture was then filtered, and washed with water. The resultant solid was dispersed in a 500 ml of 2N hydrochloric acid solution, and then thoroughly washed with water. The washed material was dried using a vacuum dryer at 80° C. for 10 hours to give rise to 95 g of a carboxylic acid-containing polymerized particle insoluble in silicone insulating oil and having an average particle diameter of 2 μm.

10 g of the resultant carboxylic acid-containing polymerized particle and 150 ml of toluene were charged into a 300 ml of flask to form a dispersion. To the dispersion, were additionally added 5 g of glycidyl methacrylate and 0.75 g of dimethylaminoethyl methacrylate. The reaction was carried out at 40° C. for 5 hours to adhere the methacryloyl group to the surface of the polymerized particle. To the solution, were added 0.1 g of azobisisobutyronitrile, 0.75 g of methacryloyl group-containing polydimethyl siloxane "Sairapurehn FMO721" (supra) as the silicone macromer (am), 0.75 g of diethyl amino ethyl methacrylate and 0.5 g of stearyl methacrylate as the dispersed phase adsorbing chain-containing monomer (by). Polymerization was carried out at 70° C. for 5 hours. To the reaction solution, were added 68 g of silicone oil "KF 96-20cs" (supra). The resultant mixture was distilled in a reduced pressure using an evaporator to give rise to a silicone oil dispersion of composite (12) (having composite (12) content of 20% by weight; hereinafter referred to as "additive dispersion (12)").

Synthetic Example 13

150 ml of toluene were charged into a 300 ml flask, to which was added 10 g of carboxylic acid group-containing polymer particle obtained in Synthetic Example 12 to form a dispersion. To the dispersion, were added 5 g of glycidyl methacrylate and 0.75 g of dimethylaminoethyl methacrylate. Polymerization was carried out at 40° C. for 5 hours allowing the methacryloyl group to introduce to the surface of the polymer particle. To the reaction solution, were added 0.1 g of azobisisobutyronitrile, 0.75 g of methacryloyl group-containing polydimethyl siloxane "Sairapurehn FMO721" (supra) as the silicone macromer (am), and 0.5 g of 1-vinyl-2-pyrrodinone as the dispersed phase adsorbing chain-containing monomer (by). The reaction was carried out at 70° C. for 5 hours. After the addition of 68 g of silicone oil "KF 96-20cs" (supra) into the reaction solution, the volatile components were removed using an evaporator under a reduced pressure to give rise to a silicone oil dispersion of composite (13) (having composite (13) of 20% by weight; hereinafter referred to as "additive dispersion (13)").

Synthetic Example 14

100 ml of toluene, 0.5 g of azobisisobutyronitrile, 10 g of methacryloyl group-containing polydimethyl siloxane "Sairapurehn FMO721" (supra) as the silicone macromer (am), 30 g of methacryloyl group-containing methoxy polyethylene glycol "NK ester M-230G" (supra) and 10 g of dimethyl amino ethyl methacrylate as the dispersed phase adsorbing chain-containing monomer (by). Polymerization was carried out at 70° C. for 5 hours. After the reaction, the resultant solution was subjected to heating using an evaporator under a reduced pressure to give rise to an oily Polymer (8).

480 ml of water, and 6.4 g of Polymer (8) were charged into a 1 liter, four necked flask equipped with a biomixer, a reflux condenser, and a thermometer to dissolve, and to which was added a mixture of 120 g of methyl methacrylate as the polymerizable monomer (α) and 3 g of azobisisobutyronitrile. The content of the flask was then dispersed using the dispersion device at 20,000 r.p.m. Polymerization was carried out at 70° C. for 8 hours. After polymerization, the used solvent of water was replaced with isopropyl alcohol by azeotropic distillation. To the resultant solution, was added 488 g of electric insulating oil containing mineral hydrocarbon as the main component (a high voltage insulating oil sold by Cosmo Oil Co., Ltd. in Japan). The volatile components were removed using an evaporator under a reduced pressure to give rise to an electric insulating oil dispersion of composite (14) (having composite (14) content of 20% by weight; hereinafter referred to as "additive dispersion (14)").

Synthetic Example 15

480 ml of water, and 6.4 g of Poval-205 (supra) were charged into a 1 liter, four necked flask equipped with a dispersion device, a reflux condenser, and a thermometer to dissolve, to which was added a mixture of 110 g of methyl methacrylate, 10 g of Industrial divinyl benzene (supra), and 3 g of azobisisobutyronitrile. The content of the flask was dispersed using the dispersion device at 20,000 r.p.m. Polymerization was carried out at 70° C. for 8 hours. The resultant solid was filtered, washed with water, and dried using a hot air dryer at 80° C. for 12 hours to give rise to 115 g of spherical, polymerized crosslinked fine particle.

100 g of the spherical, polymerized crosslinked fine particle and 400 g of a methanol solution containing 10% by weight of sodium hydroxide were charged into a 1 liter, three necked flask equipped with a stirrer and a thermometer to form a uniform dispersion. The reaction mixture was heated to 70° C., and maintained at the same temperature with stirring for 24 hours to saponify. The reaction mixture was filtered, and washed with water. The resultant solid was dispersed in 500 ml of 2N hydrochloric acid, and then thoroughly washed with water. The washed solid was dried using a vacuum dryer at 80° C. for 10 hours to give rise to 95 g of a carboxylic acid group-containing polymer particle insoluble in an insulating oil containing mainly hydrocarbons and having an average particle diameter of 2 $\mu$m.

10 g of the resultant carboxylic acid group-containing polymer particle and 150 ml of toluene were charged into a 300 ml flask to form a dispersion and to which were added 5 g of glycidyl methacrylate. The reaction was carried out at 40° C. for 5 hours to allow the methacryloyl group to adhere to the surface of the polymer particles. To the resultant reaction solution, were added 0.1 g of azobisisobutyronitrile, 0.75 g of dimethyl amino ethyl methacrylate as the dispersed phase adsorbing chain-containing monomer (by), and 1.0 g of methacryloyl group-containing polydimethyl siloxane "Sairapurehn FMO721" (supra) to be dissolved. The reaction was carried out 70° C. for 5 hours. After the addition of 68 g of electric insulating oil containing mainly mineral hydrocarbon and having a viscosity of 10 cs (supra), the resultant solution was subjected to distillation using an evaporator under a reduced pressure to remove the volatile components to give rise to an electric insulating oil dispersion of composite (15) (having composite (15) content of 20% by weight); hereinafter referred to as "additive dispersion (15)").

Synthetic Example 16

567 g of isopropyl alcohol, 6 g of azobisisobutyronitrile, 10 g of methacryloyl group-containing methoxy polyethylene glycol "NK ester M-230G" (supra) as the alkylene oxide chain-containing monomer (bm-1), 20 g of Industrial divinyl benzene (supra), and 70 g of styrene as optional (dx) were charged into a 1000 ml, four necked flask equipped with a stirrer, a reflux condenser, a thermometer, and a nitrogen gas introducing port. Stirring was carried out at room temperature for 30 minutes while introducing nitrogen gas. The mixture was heated at 65° C. for 20 hours, and further heated at 83° C. for 4 hours to be polymerized. After the addition of 400 g of silicone oil "KF 96-20cs" (supra) into the reaction solution, the volatile components of the reaction solution was distilled out using an evaporator under a reduced pressure to give rise to a silicone oil dispersion of composite (16) (having composite (16) content of 20% by weight; hereinafter referred to as "comparative additive dispersion (1)").

Synthetic Example 17

567 g of isopropyl alcohol, 6 g of azobisisobutyronitrile, 30 g of methacryloyl group-containing polydimethyl siloxane "Sairapurehn FM0721" (supra) as the silicone macromer (am), 20 g Industrial divinyl benzene (supra) as the crosslinking monomer (cx), and 40 g of styrene as optional (dx) were charged into a 1,000 ml, four necked flask equipped with a stirrer, a reflux condenser, a thermometer, and a nitrogen gas introducing port. Stirring was carried out at room temperature for 30 minutes while introducing nitrogen gas. The mixture was heated at 65° C. for 20 hours, and further heated at 83° C. for 4 hours to polymerize. To the reaction solution, were added 400 g of silicone oil "KF 96-20cs" (supra). The resultant mixture was distilled using an evaporator under a reduced pressure to remove and to give rise to a silicone oil dispersion of composite (17) (having composite (17) content of 20% by weight; hereinafter referred to as "comparative addition dispersion (2)").

Synthetic Example 18

200 g of deionized water, 2 g of sodium dodecylsulfonate, and 1 g of sodium persulfate were added into a 500 ml, four necked flask equipped with a stirrer, a reflux condenser, a thermometer, and a nitrogen gas introducing port to be dissolved, and to which were added 35 g of styrene, and 15 g of Industrial divinyl benzene (supra). Emulsion treatment was carried out while stirring at 20,000 r.p.m. using the dispersion device for 2 minutes while introducing nitrogen gas. The emulsified solution was heated at 70° C. for 3 hours, and further heated at 90° C. for 4 hours to polymerize. The treated solution was heated using an evaporator under a reduced pressure to remove the water. The resultant material was dried in an oven at 80° C. for a night to give rise to a crosslinked polymer particle (18) (hereinafter referred to as "comparative additive dispersion (3)").

Synthetic Example 19

350 g of isopropyl alcohol, 2.5 g of polyvinyl pyrrolidone, 1 g of azobisisobutyronitrile, and 50 g of styrene were charged into a 500 ml, four necked flask equipped with a stirrer, a reflux condenser, a thermometer, and a nitrogen gas introducing port. Stirring was carried out at room temperature for 30 minutes while introducing nitrogen gas. The stirred mixture was heated at 70° C. for 24 hours to polymerize. To the reaction solution, was added 200 g of silicone oil "KF 96-20cs" (supra). The resultant solution was dried using an evaporator under a reduced pressure to remove the volatile components to give rise to a silicone oil dispersion of polystyrene particle (19) (having polystyrene particle (19) content of 20% by weight; hereinafter referred to as "comparative additive dispersion (4)").

Synthetic Example 20

100 ml of toluene, 2 g of azobisisobutyronitrile, 35 g of methacryloyl group-containing polydimethyl siloxane "Sairapurehn FMO721" (supra), and 35 g of methacryloyl group-containing methoxy polyethylene glycol "NK ester M-230G" (supra) were charged into a 200 ml flask. Polymerization was carried out at 70° C. for 5 hours. After reaction, the used solvent was distilled out using an evaporator under a reduced pressure to give rise to a polymer.

68 g of silicone oil "KF 96-20cs" (supra), and 15 g of Spherical silica fine particle (having an average particle diameter of 1 μm) (supra) were charged to a 200 ml flask to form a dispersion, to which was added 2 g of the above polymer to be dispersed. A silicone oil dispersion of additive (20) was produced in which the silica particles and the polymer do not compose and separately are dispersed (having additive content (20) of 20% by weight; hereinafter referred to as "comparative additive dispersion (5)").

Synthetic Example 21

150 ml of methanol, 50 ml of deionized water, and 10 g of Spherical silica fine particle (having an average particle diameter of 1 μm) (supra) were charged into a 300 ml flask to form a dispersion, to which was added 5 g of γ-(methacryloxy propyl) trimethoxy silane. The reaction was carried out at 40° C. for 2 hours allowing the methacryloyl group to introduce to the surface of the spherical silica particle. The mixture was subjected to a reduction distillation using an evaporator, and dried at 50° C. with a vacuum dryer to give rise to a product. 150 ml of toluene and 15 g of the resultant product were charged into a 200 ml flask to form a dispersion, to which were added 0.1 g of azobisisobutyronitrile, and 1.5 g of methacryloyl group-containing polydimethyl siloxane "Sairapurehn RMO721" (supra). The reaction was carried out at 70° C. for 5 hours. To the reaction solution, was added 66 g of electric insulating oil containing mainly mineral hydrocarbon having a viscosity of 10 cs (supra). The resultant reaction solution was subjected to a reduction distillation using an evaporator to remove the volatile components and to give rise to an electrically insulating dispersion of additive (21) (having additive (21) content of 20% by weight; hereinafter referred to as "comparative additive dispersion (6) ").

EXAMPLE 1

A thousand two hundred grams (1,200 g) of deionized water and 16 g of Poval "PVA-205" (supra) were placed and dissolved in each other in a 3,000 ml, four necked flask provided with a stirrer, a reflux condenser, a thermometer, and a nitrogen gas introducing port. To the resultant solution, was added a mixture consisting of 250 g of styrene, 50 g of Industrial divinyl benzene (supra), and 5 g of benzoyl peroxide. The resultant mixture in the flask was dispersed using a dispersing device operated at a rate of 4,000 r.p.m. and heated at 70° C. for six hours and at 90° C. for two hours. By separating the solid content of the produced reaction solution by filtration, thoroughly washing the separated solid content with acetone and water, and drying the washed solid content using an air oven at 80° C. for 12 hours, 291 g of a cross-linked polymer (hereinafter referred to as "cross-linked polymer (1)") was obtained.

Then, in a 1,000 ml, three-necked flask provided with a stirrer, a reflux condenser, and thermometer, 500 g of 98 wt % sulfuric acid and 100 g of the cross-linked polymer (1) were added and cooled with ice. The mixture was stirred and heated at 80° C. for 24 hours to effect a sulfonation reaction. Thereafter, the resultant reaction mixture was poured into water at 0° C. and the solid content thereof was separated by filtration and washed with water.

The solid product thus obtained was neutralized with 380 ml of an aqueous 10 wt % sodium hydroxide solution and thoroughly washed with water. Then, it was dried using a vacuum oven at 80° C. for 10 hours, to produce 187 g of organic polymer particles having an average particle diameter of 11 μm (hereinafter referred to as "dispersed-phase particles (1)"). The anionic dissolution group density of the dispersed-phase particles (1) was 4.2 mg equivalent/g.

An electrorheological fluid (1) of the invention was obtained by drying 30 g of the dispersed-phase particles (1) at 150° C. for three hours, moistening the dried particles by standing in a chamber at a temperature of 20° C. and a relative humidity of 60% for 30 minutes, and dispersing the moistened particles uniformly in a dispersing medium prepared by adding 15 g of the additive dispersion (1) obtained in Synthetic Example 1 to 65 g of silicone oil "KF 96-20cs" (supra).

EXAMPLE 2

The procedure of Example 1 was repeated, except that 2.5 g of additive dispersion (2) obtained in Synthetic Example 2 was used instead of additive dispersion (1) and the amount of silicone oil "KF 96-20cs" (supra) was changed to 67. 5 g, to give rise to an electrorheological fluid (2).

EXAMPLE 3

24.0 g of Poval "PVA-205" (supra) was charged into a 3 liter, four necked separable flask equipped with a stirrer, a reflux condenser, and a thermometer and dissolved in 1.2 liter of water, to which were added a mixture of 405 g of styrene, 45 g of Industrial divinyl benzene (supra) and 12 g of azobisisobutyronitrile. Stirring was carried out at 7,000 r.p.m. and polymerization was carried out at 80° C. for 8 hours. The resultant solid was filtered, thoroughly washed with water, and dried using a hot air dryer at 80° C. for 12 hours to give rise to 435 g of a spherical polymer cross-linked polymer (hereinafter referred to as "cross-linked polymer (2)").

400 g of the resultant cross-linked polymer (2) and 3,000 g of 98 wt % sulfuric acid were charged into a 2 liter, four necked separable flask equipped with a stirrer, a thermometer, and a dropping funnel to form a dispersion. The reaction mixture was heated to 80° C., and maintained at the same temperature with stirring for 24 hours to saponify. The resultant reaction mixture was poured into water at 0° C., filtered, and washed with water. The solid obtained was neutralized with 2,000 ml of an aqueous 10% by weight sodium hydroxide solution, and thoroughly washed with water. The washed solid was dried using a vacuum dryer at 80° C. for 10 hours to give rise to 700 g of a sulfonic group-containing polystyrene polymer particle having an average particle diameter of 6 μm (hereinafter referred to as "dispersed phase particle (2)"). The dispersed phase particle (2) had an anionic dissolution group density of 4.2 mg equivalent/g.

30 g of dispersed phase particle (2) was dried at 150° C. for 3 hours, and then the water content thereof was regulated to 2.0 % by weight by allowing dispersed phase particle (2) to absorb moisture in the atmosphere. After regulation, dispersed phase particle (2) was dispersed in a dispersing medium which was produced by adding 4 g of additive dispersion (3) into 66 g of silicone oil "KF 96-20cs" (supra) to give rise to an electrorheological fluid (3).

EXAMPLE 4

The procedure of Example 3 was repeated, except that 3 g of additive dispersion (4) obtained in Synthetic Example 4 was used instead of additive dispersion (3), and 67 g of silicone oil "KF 96-10cs" (supra) was used instead of silicone oil "KF 96-20cs" (supra), to give rise to an electrorheological fluid (4).

EXAMPLE 5

The procedure of Example 3 was repeated, except that 7 g of additive dispersion (5) obtained in Synthetic Example 5 was used instead of additive dispersion (3), and the amount of silicone oil "KF 96- 20cs" (supra) was changed to 63 g, to give rise to an electrorheological fluid (5).

EXAMPLE 6

16.0 g of Poval "PVA-205" (supra) was charged into a 3 liter, four necked separable flask equipped with a stirrer, a reflux condenser, and a thermometer and dissolved in 1.2 liter of water, to which was added a mixture of 270 g of styrene, 30 g of Industrial divinyl benzene (supra), and 8 g of azobisisobutyronitrile. Stirring was carried out at 20,000 r.p.m. and polymerization at 80° C. for 8 hours. The resultant solid was filtered, washed with water, and dried using a hot air dryer at 80° C. for 12 hours to give rise to 293 g of a spherical cross-linked polymer (3) (hereinafter referred to as "cross-linked polymer (3)").

100 g of cross-linked polymer (3) and 700 g of 98 wt % concentrated sulfuric acid were charged into a 2 liter, four necked flask equipped with a stirrer, a thermometer, and a dropping funnel to form a dispersion. The mixture was heated to 80° C., and maintained at the same temperature with stirring for 24 hours to saponify. The reaction mixture was poured into water at 0° C., filtered, and washed with water. The obtained solid was neutralized with 500 ml of an aqueous 10% by weight of sodium hydroxide solution, and then thoroughly washed with water. The washed solid was dried using a vacuum dryer at 80° C. for 10 hours to give rise to 173 g of a sulfonic acid group-containing polystyrene polymer particle having an average particle diameter of 2.5 $\mu m$ (hereinafter referred to as "dispersed phase particle (3)"). Dispersed phase particle (3) has an anionic dissolution group density of 4.1 mg equivalent/g.

30 g of dispersed phase particle (3) was dried at 150° C. for 3 hours, and the water content regulated to 2.0% by weight by absorbing moisture in the atmosphere. After the regulation of the water content, dispersed phase particle (3) was dispersed in a dispersing medium in which 4 g of additive dispersion (6) were added into 66 g of silicone oil "KF 96-20cs" (supra), to give rise to an electrorheological fluid (6).

EXAMPLE 7

The procedure of Example 6 was repeated, except that 4 g of additive dispersion (7) obtained in Synthetic Example 7 was used instead of additive dispersion (6), and the amount of silicone oil "KF 96-20cs" (supra) was changed to 66 g, to give rise to an electrorheological fluid (7).

EXAMPLE 8

The procedure of Example 3 was repeated, except that 15 g of additive dispersion (8) obtained in Synthetic Example 8 was used instead of additive dispersion (3), and 55 g of electric insulating oil containing mainly mineral hydrocarbon having a viscosity of 10 cs (a high voltage insulating oil sold by Cosmo Co., Ltd. in Japan), to give rise to an electrorheological fluid (8).

EXAMPLE 9

The procedure of Example 3 was repeated, except that 6 g of additive dispersion (9) obtained in Synthetic Example 9 was used instead of additive dispersion (3), and 64 g of electric insulating oil containing mainly mineral hydrocarbon having a viscosity of 10 cs (supra) was used, to give rise to an electrorheological fluid (9).

EXAMPLE 10

The procedure of Example 3 was repeated, except that 4 g of additive dispersion (10) obtained in Synthetic Example 10 was used instead of additive dispersion (3), and 66 g of silicone oil "KF 96-20cs" (supra) was used, to give rise to an electrorheological fluid (10).

EXAMPLE 11

The procedure of Example 3 was repeated, except that 4 g of additive dispersion (11) obtained in Synthetic Example 11 was used instead of additive dispersion (3), and 66 g of silicone oil "KF 96-20cs" (supra) was used, to give rise to an electrorheological fluid (11).

EXAMPLE 12

The procedure of Example 3 was repeated, except that 4 g of additive dispersion (12) obtained in Synthetic Example 12 was used instead of additive dispersion (3), and 66 g of silicone oil "KF 96-20cs" (supra) was used, to give rise to an electrorheological fluid (12).

EXAMPLE 13

The procedure of Example 3 was repeated, except that 4 g of additive dispersion (13) obtained in Synthetic Example 13 was used instead of additive dispersion (3), and 66 g of silicone oil "KF 96-20cs" (supra) was used, to give rise to an electrorheological fluid (13).

EXAMPLE 14

The procedure of Example 3 was repeated, except that 4 g of additive dispersion (14) obtained in Synthetic Example 14 was used instead of additive dispersion (3), and 66 g of electric insulating oil containing mainly mineral hydrocarbon (supra) was used, to give rise to an electrorheological fluid (14).

EXAMPLE 15

The procedure of Example 3 was repeated, except that 4 g of additive dispersion (15) obtained in Synthetic Example 15 was used instead of additive dispersion (3), and 66 g of electric insulating oil containing mainly mineral hydrocarbon (supra) was used, to give rise to an electrorheological fluid (15).

COMPARATIVE EXAMPLE 1

A comparison electrorheological fluid (hereinafter referred to as "comparative fluid (1)") was produced by drying 30 g of dispersed-phase particle (1) of Example 1 at 150° C. for three hours, moistening the dried particle by standing in a chamber at a temperature of 20° C. and a relative humidity of 60% for 30 minutes, and dispersing the moistened particles in 70 g of silicone oil "KF 96-20cs" (supra).

COMPARATIVE EXAMPLE 2

30 g of dispersed phase particle (2) in Example 3 was dried at 150° C. for 3 hours, and moistened in the atmosphere to a water content of 2.0% by weight. The regulated dispersed phase particle (2) was mixed with 70 g of silicone oil "KF 96-20cs" (supra) to form a dispersion, to give rise to a comparative fluid (2).

COMPARATIVE EXAMPLE 3

30 g of dispersed phase particle (2) in Example 3 was dried at 150° C. for 3 hours, and moistened in the atmosphere to the water content of 2.0% by weight. The regulated dispersed phase particle (3) was mixed with 70 g of silicone oil "KF 96-10cs" (supra) to form a dispersion, to give rise to a comparative fluid (3).

COMPARATIVE EXAMPLE 4

30 g of dispersed phase particle (2) in Example 3 was dried at 150° C. for 3 hours, and moistened in the atmosphere to a water content of 2.0% by weight. The regulated dispersed phase particle (2) was mixed with 70 g of electric insulating oil containing mainly mineral hydrocarbon of 10cs (supra) to form a dispersion, to give rise to a comparative fluid (4).

COMPARATIVE EXAMPLE 5

30 g of dispersed phase particle (3) in Example 6 was dried at 150° C. for 3 hours, and moistened in the atmosphere to a water content of 2.0% by weight. The regulated dispersed phase particle (3) was mixed with 70 g of silicone oil "KF 96-20cs" (supra) to form a dispersion, to give rise to a comparative fluid (5).

COMPARATIVE EXAMPLE 6

The procedure of Example I was repeated, except that 15 g of comparative additive dispersion (1) in Synthetic Example 16 was used instead of additive dispersion (1), and the amount of silicone oil "KF 96-20cs" (supra) was changed to 55 g, to give rise to a comparative electrorheological fluid (hereinafter referred to as "comparative fluid (6)").

COMPARATIVE EXAMPLE 7

The procedure of Example 1 was repeated, except that 15 g of comparative additive dispersion (2) in Synthetic Example 17 was used instead of additive dispersion (1), and the amount of silicone oil "KF 96-20cs" (supra) was changed to 55 g, to give rise to a comparative electrorheological fluid (hereinafter referred to as "comparative fluid (7)").

COMPARATIVE EXAMPLE 8

The procedure of Example 3 was repeated, except that 1 g of comparative additive (3) in Synthetic Example 18 was used instead of additive dispersion (3), and the amount of silicone oil "KF 96-20cs" (supra) was changed to 69 g, to give rise to a comparative electrorheological fluid (hereinafter referred to as "comparative fluid (8)").

COMPARATIVE EXAMPLE 9

The procedure of Example 3 was repeated, except that 1 g of comparative additive (3) in Synthetic Example 18 was used instead of additive dispersion (3), and 69 g of electric insulating oil containing mainly mineral hydrocarbon of 10 cs (supra) were used instead of silicone oil, to give rise to a comparative electrorheological fluid (hereinafter referred to as "comparative fluid (9)").

COMPARATIVE EXAMPLE 10

The procedure of Example 1 was repeated, except that 10 g of amino modified silicone having nitrogen atom (a silicone additive, under the tradename of "KF8005", sold by Shin-etsu Chemical Industry Co., Ltd. in Japan) was used instead of additive dispersion (3) in Example 3, and the amount of silicone oil "KF 96-20cs"(supra) was changed to 60 g, to give rise to a comparative electrorheological fluid (hereinafter referred to as "comparative fluid (10)").

COMPARATIVE EXAMPLE 11

The procedure of Example 3 was repeated, except that 4 g of comparative additive dispersion (4) in Synthetic Example 19 was used instead of additive dispersion (3) in Example 3, and the amount of silicone oil "KF 96-20cs" (supra) was changed to 66 g, to give rise to a comparative electrorheological fluid (hereinafter referred to as "comparative fluid (11)").

COMPARATIVE EXAMPLE 12

The procedure of Example 3 was repeated, except that 4 g of comparative additive dispersion (5) in Synthetic Example 20 was used instead of additive dispersion (3) in Example 3, and the amount of silicone oil "KF 96-20cs" (supra) was changed to 66 g, to give rise to a comparative electrorheological fluid (hereinafter referred to as "comparative fluid (12)").

COMPARATIVE EXAMPLE 13

The procedure of Example 3 was repeated, except that 4 g of comparative additive dispersion (6) in Synthetic Example 21 was used instead of additive dispersion (3) in Example 3, and 66 g of electric insulating oil containing mainly mineral hydrocarbon of 10 cs (supra) were used instead of silicone oil, to give rise to a comparative electrorheological fluid (hereinafter referred to as "comparative fluid (13)").

EXAMPLE 16

The viscosity of each of the electrorheological fluids of the present invention (1)-(15) in Examples 1-15 and the comparative fluids (1)-(13) in Comparative Examples 1-13, was measured at 25° C. under the conditions of no electric field.

Each of electrorheological fluids and comparative fluids was filled to 100 mm from the bottom of a test tube having a height of 150 mm and a diameter of 15 mm. The tube was airtightly sealed, and left standing at room temperature so as to monitor the sedimentation of the dispersed phase particle. The height of the sedimentation layer, which occurred from sedimentation of the dispersed phase particle of the electrorheological fluid, was measured after a day and a week to evaluate the dispersion stability of electrorheological fluid.

50 ml of each of the electrorheological fluids and the comparative fluids were charged into a 100 ml vessel, which was airtightly sealed. After being left standing for a month, the vessel was rotated at 30 r.p.m. to resume the initial uniform state of the test sample. A number of rotation required for each fluid to resume the initial uniform state was measured to evaluate re-dispersibility. The test results are shown in Table 1 below.

Each of the electrorheological fluids and the comparative fluids was measured using a coaxial rotary viscometer with electric fields for the value of shear stress (initial) and the simultaneous electric current density (initial) when an alternating electric current external electric field 4,000 V/mm (frequency:50 Hz)was applied at 25° C. under the conditions of a gap between outer and inner cylinders of 1.0 mm and a shear rate of 400/s. Each of the electrorheological fluids and the comparative fluids was continuously treated using the viscometer under the conditions of 25° C. and an external electric field loading of 4,000 V/mm for 3 days, and then measured for shear stress and for current density to evaluate the stability with time. The test results are shown in Table 1.

TABLE 1

|  | Viscosity (cp) | Dispersion stability (mm) a day | Dispersion stability (mm) a week | Re-dispersibility (rotation) | Shear stress (g/cm$^2$) Ini. | Shear stress (g/cm$^2$) 3 day | Current density ($\mu$A/cm$^2$) Ini. | Current density ($\mu$A/cm$^2$) 3 day |
|---|---|---|---|---|---|---|---|---|
| (1) | 90 | 95 | 92 | 4 | 21 | 22 | 20 | 21 |
| (2) | 92 | 90 | 80 | 20 | 22 | 23 | 21 | 22 |
| (3) | 90 | 92 | 86 | 7 | 21 | 22 | 20 | 21 |
| (4) | 58 | 88 | 83 | 5 | 22 | 22 | 20 | 21 |
| (5) | 83 | 90 | 83 | 12 | 19 | 20 | 20 | 22 |
| (6) | 62 | 90 | 89 | 5 | 9 | 8 | 18 | 18 |
| (7) | 52 | 81 | 79 | 8 | 8 | 7 | 20 | 19 |
| (8) | 106 | 92 | 90 | 9 | 20 | 19 | 19 | 18 |
| (9) | 97 | 90 | 88 | 8 | 19 | 19 | 18 | 18 |
| (10) | 90 | 88 | 85 | 7 | 21 | 22 | 20 | 21 |
| (11) | 95 | 92 | 86 | 9 | 20 | 19 | 20 | 19 |
| (12) | 83 | 80 | 75 | 10 | 22 | 23 | 21 | 22 |
| (13) | 105 | 85 | 83 | 12 | 19 | 20 | 20 | 22 |
| (14) | 120 | 72 | 68 | 8 | 21 | 22 | 20 | 18 |
| (15) | 90 | 83 | 75 | 12 | 19 | 20 | 19 | 17 |
| *(1) | 50 | 35 | 35 | >100 | 25 | 26 | 22 | 23 |
| *(2) | 50 | 35 | 35 | 60 | 24 | 23 | 22 | 21 |
| *(3) | 35 | 35 | 35 | 50 | 22 | 22 | 20 | 20 |
| *(4) | 35 | 35 | 35 | 60 | 21 | 20 | 22 | 20 |
| *(5) | 52 | 35 | 35 | 50 | 10 | 11 | 19 | 20 |
| *(6) | 65 | 35 | 35 | >100 | 23 | 21 | 23 | 25 |
| *(7) | 81 | 35 | 35 | >100 | 22 | 22 | 22 | 22 |
| *(8) | 240 | 65 | 60 | >100 | 6 | 6 | 10 | 11 |
| *(9) | 240 | 65 | 60 | >100 | 6 | 6 | 13 | 14 |
| *(10) | 100 | 92 | 35 | >100 | 18 | 19 | 27 | ** |
| *(11) | 400 | 71 | 70 | >100 | 23 | 22 | 20 | 20 |
| *(12) | 50 | 35 | 35 | 60 | 23 | 24 | 22 | 21 |
| *(13) | 40 | 40 | 35 | 50 | 19 | 18 | 20 | 19 |

(1)–(15) :Electrorheological fluid
Ini. :Initial stage
3 day :3 days after
*(1)–*(13) :Comparative fluid
** = not measured. It was not measured beyond the range of the viscometer.

It is clear from Table 1 that the present electrorheological fluids excel in that under a relatively weak electric field, large shear stress was generated and the simultaneous electric current densities were small, that the generated shear stress and the electrical current density were stable for a prolonged time, and that fluidity, dispersion stability and re-dispersibility excel under the conditions of no electric field loading.

Electrorheological fluids (1) and (2) were superior in dispersion stability and re-dispersibility in comparison with comparative fluid (1) using the same dispersed phase and dispersing medium and without an additive; comparative fluid (6) using composite (16) without the polysiloxane-containing structure unit (A); and comparative fluid (7) using composite (17) without the dispersed phase adsorbing chain-containing structural unit (B).

Electrorheological fluids (3), (5) and (10), (13) were superior in dispersion stability, re-dispersibility or fluidity in comparison with comparative fluid (2) using the same dispersed phase and dispersing medium, and not using an additive; comparative fluids (8) and (11) using polystyrene particles; comparative fluid (10) using an amino-modified silicone as a nitrogen-containing silicone type additive and comparative fluid (12) using additive (20) in which silica particles and polymers were not composed.

Electrorheological fluid (4) was superior in dispersion stability and re-dispersibility in comparison with comparative fluid (3). Electrorheological fluids (6) and (7) were superior in dispersion stability and re-dispersibility in comparison with comparative fluid (5).

Electrorheological fluids (8), (9), (14), and (15), if mineral insulating oil was used, were superior in dispersion stability, re-dispersibility or fluidity in comparison with comparative fluid (4); comparative fluid (9) using polystyrene particle; and comparative fluid (13) using composite (21) without the dispersed phase adsorbing chain-containing structure unit (B).

The electrorheological fluid of the present invention excels in that even when a relatively low electric field is applied to the fluid, a large shear stress is generated while the current density is small. The generated shear stress and current density exhibit excellent stability properties with time. The present invention also has excellent properties in regard to the dispersion stability under the conditions of no electric field (the ability to uniformly maintain an electrorheological fluid and not settle or float the dispersed phase therein), re-dispersibility (the ability to resume the uniform electrorheological fluid by applying a simple external force when the dispersed phase has settled and floated to form a non-uniform state), and fluidity (having a low viscosity under the conditions of no electric field). Accordingly, the electrorheological fluid can be suitable to use for engine mount, damper, brake, shock absorber, actuator, or valve, or the like.

What is claimed is:

1. An electrorheological fluid comprising a dispersed phase made of a dielectric particle, a dispersing medium made of an insulating liquid, and an additive, said additive being substantially insoluble in said dispersing medium, and being a composite containing a polysiloxane-containing structural unit (A) represented by the following formula (1):

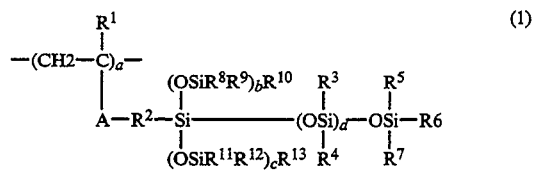

wherein A is —COO—; $R^1$ a hydrogen atom or methyl group, $R^2$ an alkylene group of 1–6 carbon atoms, $R^3$–$R^{13}$ are the same or different aryl groups, alkyl groups of 1–6 carbon atoms, or alkoxy groups of 1–10 carbon atoms, a an integer, b and c the same or different integers of 0–10, d an integer of 0–200, and at least one dispersed phase adsorbing chain-containing structural unit (B) selected from the group consisting of a long hydrocarbon chain-containing structural unit (B-3) represented by the following formula 4:

wherein E is —COO— or phenylene group, $R^{19}$ a hydrogen atom or methyl group, $R^{20}$ an alkyl group of 4–30 carbon atoms, and i an integer.

2. An electrorheological fluid according to claim 1, wherein said composite is a cross-linked polymer having a polysiloxane-containing structural unit (A) and a dispersed phase adsorbing chain-containing structural unit (B).

3. An electrorheological fluid according to claim 1, wherein said composite is composed of a particle (I) substantially insoluble in said insulating liquid and a polysiloxane-containing polymer (II) having said polysiloxane-containing structural unit (A) and said dispersed phase adsorbing chain-containing structural unit (B).

4. An electrorheological fluid according to claim 3, wherein the ratio of said particle (I) to said polysiloxane-containing polymer (II) is 100:1–100 parts by weight.

5. An electrorheological fluid according to claim 3, wherein said polysiloxane-containing polymer (II) is fixed on the surface of said particle (I).

6. An electrorheological fluid according to claim 3, wherein said particle (I) is linked to said polysiloxane-containing polymer (II) by a chemical bonding.

7. An electrorheological fluid according to claim 3, wherein said polysiloxane-containing polymer (II) is produced by polymerizing monomer mixture (Y) containing a silicone macromer (am) represented by the following formula 5:

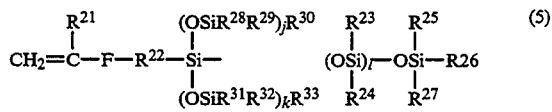

wherein F is —COO— or a phenylene group, $R^{21}$ a hydrogen atom or methyl group, $R^{22}$ an alkylene group of 1–6 carbon atoms, $R^{23}$–$R^{33}$ are the same or different aryl groups, alkyl groups of 1–6 carbon atoms, and alkoxy groups of 1–10 carbon atoms, j and k the same or different integers of 0–10, and l an integer of 0–200 are the same as defined above, at least one dispersed phase adsorbing chain-containing monomer (by) selected from the group consisting of chain-containing monomer (b-3) represented by the following formula 8:

wherein the symbol K is —COO— or a phenylene group, $R^{39}$ a hydrogen atom or methyl group, and $R^{40}$ an alkyl group of 4–30 carbon atoms, and an optional (dy).

8. An electrorheological fluid according to claim 3, wherein said monomer mixture (Y) contains 10 to 90% by weight of said silicone macromer (am), 10 to 90% by weight of said dispersed phase adsorbing chain-containing monomer (by), and 0 to 80% by weight of optional (dy), provided the sum of the monomers used is 100% by weight.

9. An electrorheological fluid according to claim 3, wherein said composite is obtained by dispersion polymerization of polymerizable monomer (α) in the presence of said polysiloxane-containing polymer (II) to produce particle (I).

10. An electrorheological fluid according to claim 9, wherein said insulating liquid is a silicone insulating oil.

11. An electrorheological fluid according to claim 10, wherein dispersed phase adsorbing chain-containing monomer (by) is long hydrocarbon chain-containing monomer (b-3) represented by the following formula 8:

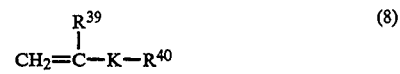

wherein the symbol K is —COO— or a phenylene group, $R^{39}$ a hydrogen atom or methyl group, and $R^{40}$ an alkyl group of 4–30 carbon atoms.

12. An electrorheological fluid according to claim 3, wherein said composite is produced by emulsion polymerization of said polymerizable monomer (α) in the presence of said polysiloxane containing polymer (II) in an aqueous medium to produce said particle (I).

13. An electrorheological fluid according to claim 7, wherein said composite is produced by polymerization of said monomer mixture (Y) in the presence of an organic or inorganic fine particle having a polymerizable, reaction group as particle (I) to give rise to said polysiloxane-containing polymer (II).

* * * * *